United States Patent [19]

Hirsch

[11] 4,142,088
[45] Feb. 27, 1979

[54] METHOD OF MOUNTING A FUEL PELLET IN A LASER-EXCITED FUSION REACTOR

[75] Inventor: Robert L. Hirsch, Potomac, Md.

[73] Assignee: The United States of America as represented by the United States Department of Energy, Washington, D.C.

[21] Appl. No.: 649,948

[22] Filed: Jan. 27, 1976

Related U.S. Application Data

[63] Continuation of Ser. No. 389,289, Aug. 17, 1973, abandoned.

[51] Int. Cl.² .............................................. B23K 9/00
[52] U.S. Cl. ............................................... 219/121 L
[58] Field of Search ...... 219/121 L, 121 LM, 121 EB

[56] References Cited

U.S. PATENT DOCUMENTS

| | | | |
|---|---|---|---|
| 2,753,458 | 7/1956 | Kazato et al. | 219/121 EB |
| 2,824,232 | 2/1958 | Steigerwald | 219/121 EB |
| 3,156,809 | 11/1964 | Stearns | 219/121 EB |

OTHER PUBLICATIONS

S2804.0055, Nature, vol. 239, No. 5318, Sep. 1972, pp. 139-142.
Microwaves, 1969, "Laser News" Laser for H-Bomb Trigger?, pp. 122, 123.
New Scientist, Feb. 1969, "A Laser Trigger" for H-Bombs?.
Fortune, Dec. 1974, pp. 149-152 & 154, 156.

Primary Examiner—J. V. Truhe
Assistant Examiner—Fred E. Bell
Attorney, Agent, or Firm—Dean E. Carlson; Leonard Belkin; Cornell D. Cornish

[57] ABSTRACT

Laser irradiation means for irradiating a target, wherein a single laser light beam from a source and a mirror close to the target are used with aperture means for directing laser light to interact with the target over a broad area of the surface, and for protecting the laser light source.

9 Claims, 4 Drawing Figures

INVENTOR.
Robert L. Hirsch

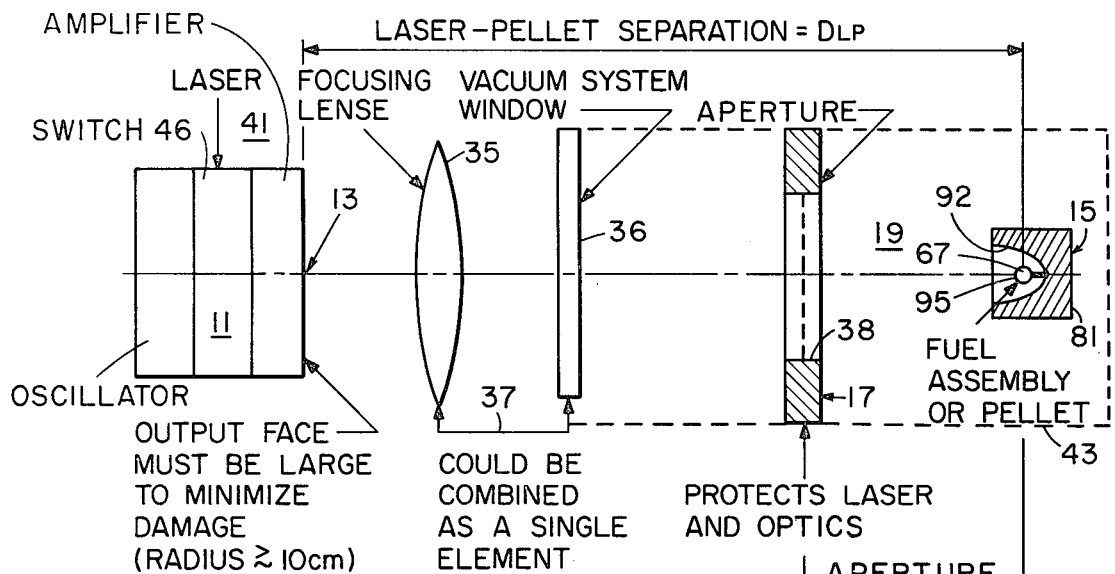
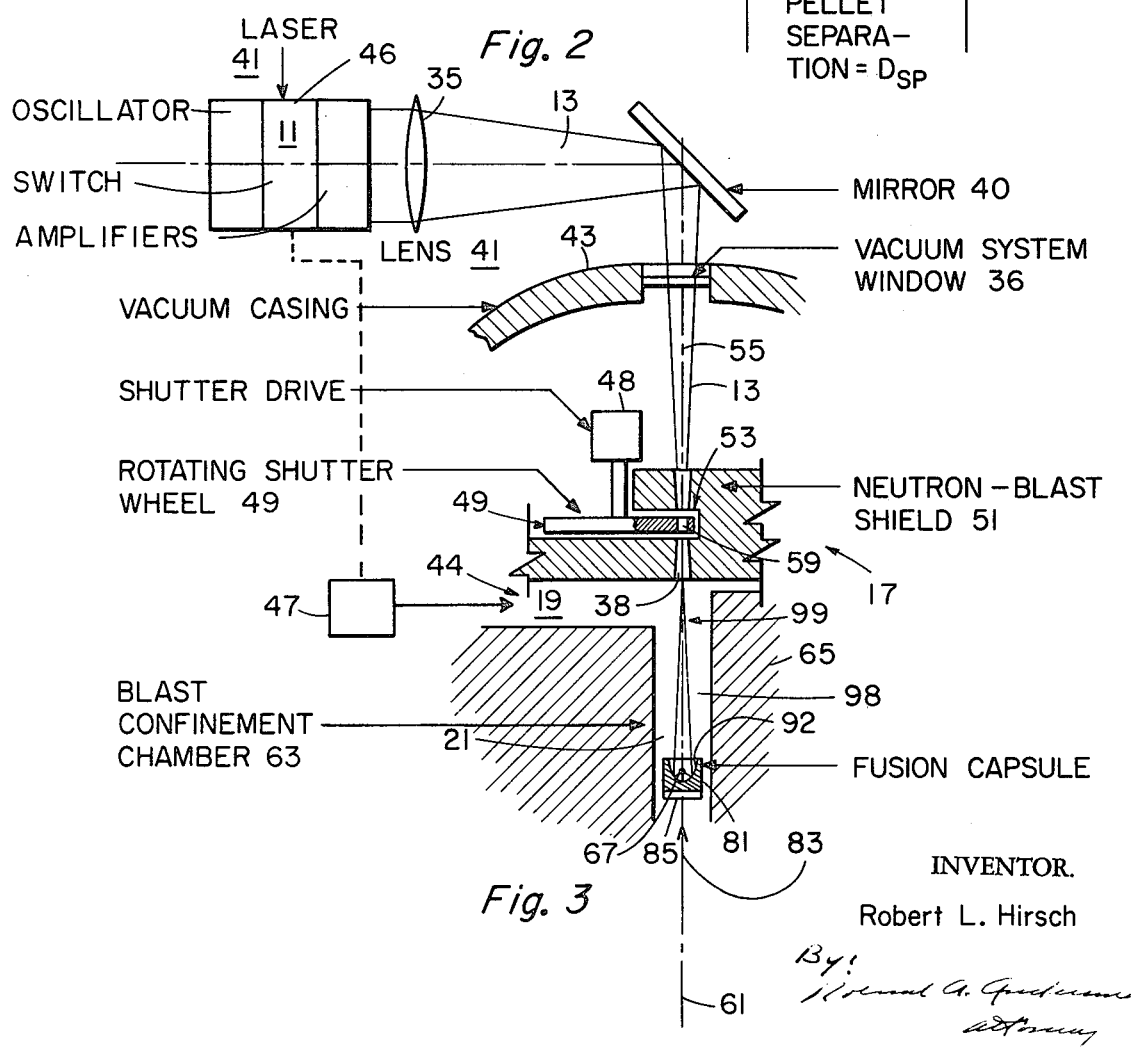

METHOD OF MOUNTING A FUEL PELLET IN A LASER-EXCITED FUSION REACTOR

This is a continuation, of application Ser. No. 389,289, filed Aug. 17, 1973 now abandoned.

CROSS-REFERENCE TO RELATED APPLICATIONS

1. U.S. Application Ser. No. 14,220 Filed Apr. 1, 1970 Inventor — John M. Dawson Assigned to the assignee of this application
2. Ser. No. 10,516 Arthur P. Fraas Pulsed Laser Ignited Thermonuclear Reactor Feb. 11, 1970

BACKGROUND OF THE INVENTION

This invention was made in the course of, or under a contract with the United States Atomic Energy Commission.

It is advantageous to irradiate a target with laser light to produce a high temperature plasma. As contemplated by the "blascon" concept and as described by Dawson, J. M., in Phys. Fluids 7, 981 (1964); Lubin, M. J. in Bull. Am. Phys. Soc., 13, 1552 (1968); and in the Proceedings of the Third Conference on Plasma Physics and Controlled Fusion Research, Novosibirsk, 1968, and/or by Linhart, J. G., in Nuclear Fusion 10, 211 (1970), which are incorporated by reference herein, such plasmas can be used for thermonuclear research and/or power production.

It is an object of this invention, therefore, to produce laser-target irradiation with a single laser light source;

It is another object to provide improved means for irradiating and controlling the irradiation of a target with a laser light beam from a single laser source;

It is still another object to produce a plasma of thermonuclear interest by the use of laser light for irradiating a target;

It is also an object to produce a laser-pellet microexplosion;

It is still a further object to protect a laser light source from the reaction products produced by interacting laser light with a target.

SUMMARY OF THE INVENTION

This invention provides means and a method for irradiating a target with a single laser light source and protecting the laser light source, wherein the laser light from the source is focused through an aperature and onto the target by a shaped mirror that holds the target close to the mirror for producing a high temperature plasma in which fusion reactions will take place. When more fusion energy is liberated than energy invested to initiate the reaction, a device of use as a source of electric power will have been created. More particularly, this invention focuses the laser light through an aperture that protects the laser light source from microexplosions that are produced by utilizing a focusing mirror close to the target having a support that holds the target at the focus of the mirror. In one embodiment, the target is held in a lithium, elliptically-shaped, reflector which uses a lithium support that holds the target at the focus of the reflector. Advantageously, the target is a cooled, solid, hydrogen-isotope containing target that is held in a solid lithium focusing reflector that is shaped radially to reflect the incident laser light rays from the laser light beam source against the target, substantially to provide a high laser light flux at substantially the entire surface of the target. In another aspect this invention provides improved laser-target irradiation means having an aperture and/or shutter, which when open allows laser light to be directed against a focusing reflector forming a target holder and a target held in the holder, whereby the shutter protects the laser from the reaction products produced by the interaction of the laser light with the target. With the proper selection of elements and steps, as described in more detail hereinafter, the desired laser-target irradiation, high temperature plasma, and laser protection are achieved.

The above and further novel features and objects of this invention will appear more fully from the following detailed description when the same is read in connection with the accompanying drawings, and the novel features will be particularly pointed out in the appended claims.

BRIEF DESCRIPTION OF THE DRAWINGS

In the figures where like elements are referenced alike:

FIG. 2 is a partial cross-section of the apparatus of this invention for producing the laser-target irradiation for the energy produding system of FIG. 1;

FIG. 3 is a partial cross-section of one embodiment of the laser light focusing system of this invention;

DESCRIPTION OF THE PREFERRED EMBODIMENT

Figure 1:
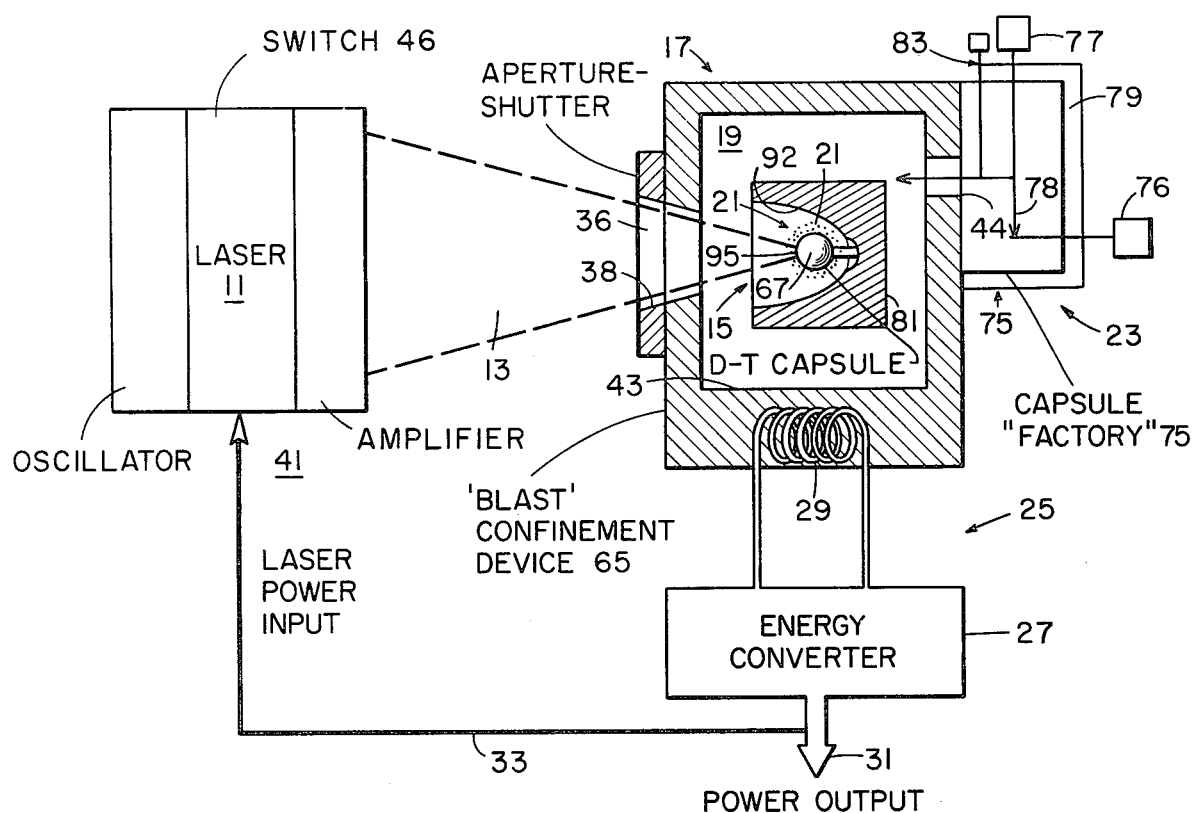
FIG. 1 is a partial schematic view of the major elements of the energy producing system for the apparatus of this invention.

This invention is useful for irradiating high density targets with laser light from a laser source. As such, this invention is useful in the "blascon" described in the above-mentioned co-pending Fraas application. However, this invention is also broadly useful in thermonuclear research directed toward the production of high-temperature plasmas. Thus, as will be understood in more detail hereinafter, this invention us useful in the wide variety of applications requiring high temperature plasmas, including many of the applications to which the heretofore known thermonuclear research reactors have been applied. In this regard, for example, this invention may be useful in the production of power, or in many of the applications to which the heretofore known thermonuclear research reactor systems have been known or used. Thus, while this invention is described herein as utilizing a solid hydrogen-isotope containing target, such as a hydrogen, deuterium, tritium or a D,T target, any of the heretofore known high Z (atomic weight) materials employed in thermonuclear research heretofore may be used, as will be understood in more detail from the following. In this regard, as described by Linhart in Nuclear Fusion 10, p. 211 et seq. (1970), it is clearly advantageous to create a dense D,T target by irradiating the target with from 1KJ up to 10MJ of laser light energy and converting the same energy in the irradiated target into plasma thermal energy in a time of the order of 1 n sec, and in a volume of a few cubic millimeters.

It will be understood herein, that this invention contemplates a complete destruction of the target involved. However, at its minimum limits, the system of this invention is broadly useful in any application requiring the interaction with a high density target of laser light from a source. Thus, the specification describes how to use the preferred embodiment of the aperture and focusing system of this invention to irradiate a high density hydrogen-isotope containing target. Also, the specification describes how to use the preferred embodiment of this invention to produce a rapidly heated plasma. The specification additionally describes how to use the system of this invention for producing fusion of target nuclei, and for protecting a laser source for producing laser-target interactions from the reaction products produced by such interactions.

As described in the above-mentioned publications, and as known in art, the discovery of high powered lasers and laser amplifiers, enables one to achieve by focusing a single laser beam, energies and power densities unobtainable in any other way. This is because the focusing of photons is unique, owing both to the absence of repulsion between the photons and to the possibility of suitable optical focusing apparatus. By means of the well-known focusing and shortening of a conventional laser pulse, it is thus possible to obtain very high power densities. This invention utilizes the above-mentioned, well-known, high power density lasers, although higher or lower laser light power densities may also be used in accordance with this invention. For ease of explanation, the laser system of the above-identified co-pending Fraas application, which is incorporated by reference herein, is used in accordance with this invention. However, other small focus area lasers having suitable amplifiers, lenses and conventional timing controls are advantageously used in the various examples of this invention described herein. One such system for obtaining a large power output, comprises arranging co-axial, parallel, spaced apart, rod and disc shaped Nd glass laser elements in spaced apart relation to each other and pumping them to stimulate their light amplification and emission of light radiation by suitable excitation means well known in the art to produce a laser beam output that can be readily focused and bent by lenses and/or silvered or other mirrors, such as heretofore known in the art. However, $CO_2$ lasers, such as described in U.S. Pat. No. 3,596,202, or any other high powered continuous or pulsed laser system can be used in accordance with this invention.

In understanding this invention, it is known from the above-mentioned publications, as well as from Phys. Fluids 5, 517 (1962); Phys. Fluids 9, 2047 (1966), and NYO-3578-1 through NYO-3578-12, that lasers can irradiate high density targets to produce a high temperature plasma. In particular, publications F-7 and F-8 of the above-mentioned Novosibirsk Conference have shown that a fully ionized, symmetrically and spherically shaped plasma with energies per particle of 1 keV may be achieved by irradiating a solid, ball-shaped target with high intensity, large amplitude, narrow pulse width, laser light. As described in the above-mentioned publications, as well as in the publications under USAEC contract At(30-1)-4054 with the University of Rochester, the laser light energy is advantageously added in a time that is short compared to the plasma expansion time t, since, in accordance with the Lawson plasma energy release criteria, such expansion reduces the peak plasma density. For plasmas having temperatures of from 1 to 10 keV, t is from a few nanoseconds down to several tens of picoseconds respectively, which is within the capability of conventional lasers. In one example, it is also understood that $n\tau = 10^{14}$ at a temperature of 10 keV, where n is the plasma density and $\tau$ is the confinement time or more particularly in this case the lifetime of the plasma at its highest temperature and density. This is evident from eq. (4) on page 212 of the above-mentioned publication by Linhart in Nuclear Fusion, 10, (1970). From the latter publication, it is known that the time the plasma stays together is related to $\tau = r/V_s$ where r is the radius of the plasma and $V_s$ is the velocity of the hot plasma.

It is thus contemplated by this invention, as understood in more detail hereinafter, that sufficient laser energy can be used to heat a small solid target in a short enough time to satisfy the plasma expansion criteria. Moreover, it is understood that a solid target can be heated with so much laser light energy so fast that a micro-explosion can be produced before the resulting plasma can expand and thereby no longer produce significant fusion energy. As will be understood by one skilled in the art, this invention produces a rapidly heated, dense plasma, such as has been known heretofore from the above mentioned publications, and the preferred embodiment need not involve magnetic confinement.

In any event, however, it will be understood that this invention provides means and a method for impacting large amounts of laser light energy from a single laser light source against a small, high density target in a short period of time, as distinguished from the systems described in U.S. Pat. Nos. 3,378,446 and 3,489,645, which required a plurality of independent laser light sources.

Referring now to FIG. 1, in one embodiment this invention can be used for electrical power production by nuclear fusion processes. To this end, laser 11 directs a laser light beam 13 against a hydrogen-isotope containing assembly capsule 15 located in an aperture means 17 forming a vacuum chamber 19 adapted to at least partially confine the reaction products, comprising a plasma 21 produced by irradiating the hydrogen-isotope contained in the capsule with laser light from source 11. In this regard, moreover, released fusion energy can be converted into power.

While not limited thereto, for each of explanation power producing system 23 of the embodiment of this invention shown in FIG. 1, comprises a conventional heat engine 25 having an energy converter 27 and a coil 29 for receiving heat energy released by the fusion reactions induced in capsule 15. By circulating a hot fluid from the coil 29 into converter 27, a power output 31 can be produced in the form of a useful electrical current. A part of this electrical energy might be directed through lead 33 from converter 27 for energizing laser 11. It will be understood in the art, that converter 27 may be a Carnot or other conventional cycle heat engine, a magnetohydrodynamic converter, a thermoelectric converter, or thermionic or other converter. However, this invention may alternately produce thrust, x-rays, etc. as understood in the art.

As illustrated in FIG. 2, the source 11 may have a conventional focusing lens 35, while the aperture means 17 may have a window 36 that is combined as a lens in a single element 37. In each case the aperture means 17 of this invention protects the laser 11, and/or at least some of the optics therefor. In any event, a simple small aperture 38 formed by aperture means 17 provides at least a partial shield for the reaction products from the interaction of beam 13 with capsule 15.

Referring now to the apparatus of FIG. 3, laser light beam 13 passes through a first conventional lens 35 for focusing the beam 13 onto a mirror 40 for reflecting beam 13 into vacuum chamber 19 in aperture means 17 through a transparent window 36 that seals against leakage of air from the ambient 41 into chamber 19. Advantageously, aperture means 17 is place inside of vacuum chamber 19 formed by vacuum shell 43 of high strength metal, such as niobium, but other materials may be used, e.g. stainless steel. This shell 43 encompasses vacuum chamber 19 in a vacuum tight manner. Also, aperture means 17 provides conventional vacuum tight ports 44 for evacuating chamber 19, and/or for suitably introducing a hydrogen-isotope containing assembly capsule 15 into chamber 19. For ease of explanation the laser beam 13 is shown coming vertically downwardly, but it will be understood in the art the orientation of the structure of FIG. 3 may be reversed, whereby the assembly of capsule 15 may be positioned downwardly toward aperture 38. In this regard moreover, it will be understood that the assembly of capsule 15 may be rigidly positioned in a jig at a fixed distance $D_{sp}$ from aperture 38 and/or spun for stability as it moves by free fall or otherwise relative to aperture 38, whereupon the laser beam 13 hits the capsule 15 when it reaches the desired location at a distance $D_{SP}$ from aperture 38. In free-fall, a suitable timing device 46 responsive to photoelectric sensors 47 may be used, such as is known in the art. One such sensor 47 is shown in the above-mentioned publications, and a Kerr cell laser timing device 46 is described in U.S. Pat. No. 3,519,328. The sensor is shown schematically above the blast confinement channel so that damage to the sensor from the microexplosion is minimized. With the use of a "Blascon" the sensor would thereby be above the vortex and not interfere with its formation and maintenance as understood in more detail hereinafter.

As shown in FIG. 3, a constant speed motor 48 may advantageously rotate a high speed shutter wheel 49, and although wheel 49 is shown located in a shell 43 having therein a blast shield 51, which inhibits passage of neutrons, x-rays, and expanding plasma, and which receives and transmits the beam 13 to the hydrogen containing assembly capsule 15, such as shutter may be used inside or outside of a suitable shell. It cannot be located at window 36 because of damage problems when the beam diameter is small as will be understood by one skilled in the art. In the example of FIG. 3, however, wheel 49 rotates in a slot 53 in the illustrated shield 51 at right angles to the axis 55 of the focused laser light beam 13, whereby this focused beam 13 passes through a tapered aperture 38 in a shield 51 whose axis is co-axial with axis 55. To this end, the beam 13 passes through opening 59 in wheel 49 as the wheel rotates to line up the axis of wheel opening 59 with the axis of shield aperture 38 in shield 51. These axes are all co-axial with each other and with axis 61 of the capsule 15.

The mere existance of small aperture 38 between target 67 and window 36 and mirror 40 means that little of the reaction products from a microexplosion of 67 will intercept window 36 and mirror 40. The purpose of shutter 49 is to further reduce the flux of reaction products on 36 and 40. But it may not be necessary to use shutter 49 in practice because aperture 38 can be so small.

As shown in FIG. 3, element 65 defines the side of the blast confinement chamber 63 along a portion of the laser beam axis.

Figure 4:
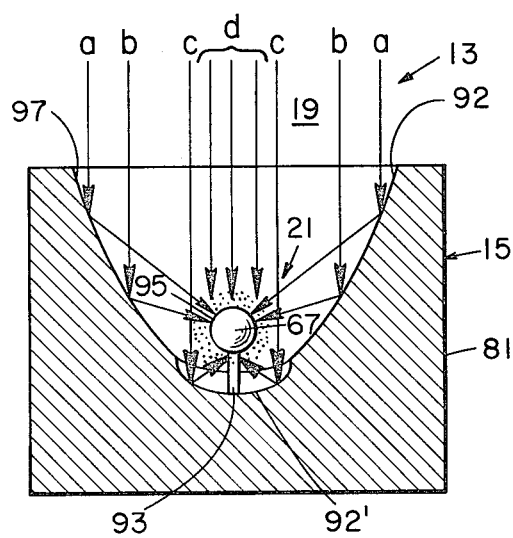
FIG. 4 is a partial cross-section of a target fuel capsule for the apparatus of this invention.

One preferred embodiment of the hydrogen-isotope containing capsule 15 of this invention, forms a target 67, as shown in detail in FIG. 4. Target 67, advantageously comprises a solid spherical ball of 50% deuterium and 50% tritium, although other solid or high density targets 67, liquid hydrogen, D,T, or other such suitable materials comprising D-T or other high density targets, such as LiH, may alternately be used. Advantageously, a suitable cryostat having a low temperature cryostatic fluid flowing therethrough, maintains the target 67 in a solid state prior to irradiation by beam 13. In the case of a 50/50 D-T pellet shaped target 67, the assembly capsule 15 is made in a suitable capsule fabricator 75 having a suitable gas supply 76, transport means 77, advantageously having a shape forming means 78, and cooling means, such as a cryostat 79, for producing an integral one-piece assembly capsule 15 forming a D-T containing pellet-shaped target 67 mounted on a support in a casing 81 having a reflecting surface, which is described in more detail hereinafter. Advantageously, the cryostat 79 is adapted to maintain the described target apparatus in its solid state on the basis of a one-shot pulsed operating sequence.

In one embodiment, the casing 81, which is advantageously a cylindrical symmetric casing 81 for a D-T containing target 67, is made of solid lithium. To this end, the casing 81 is advantageously formed in a suitable fabricator 75, and a D-T pellet shaped target 67 is carefully positioned near the bottom of casing 81 by a pellet shaping means 78 in fabricator 75, as understood in the art, whereby the casing 81 having the pellet 67 therein can be dropped by free fall in aperture means 17 from the top, thereof for centering therein at the focus of the incoming laser light beam 13. In this regard, the capsule 15 and the casing 81 thereof may be rotated by a rotater 83 for stabilizing the assembly capsule 15 during its free-fall into the irradiation chamber 19 of aperture means 17. Alternately, however, the capsule 15 and the casing 81 are on a retractable jig 85 rigidly to position the capsule 15 and casing 81 before the irradiation thereof by laser light beam 13.

While any pellet forming means may be used for forming target 67, one suitable means is the vibrating block type described and shown in FIG. 6 of Annula Progress Report from Nov. 15, 1968 through Nov. 14, 1969, under USAEC Contract AT(30-1)-4054 with the University of Rochester, or the type described in the co-pending application Ser. No. 147,489, filed May 27, 1971, and assigned to the assignee herein.

Referring more particularly to the preferred embodiment of the assembly of capsule 15, which is shown in FIG. 4, the casing 81 has an inner generally elliptic shaped, reflecting surface 92 that reflects laser rays "a" & "b" in beam 13, radially or nearly radially into the target 67, which mounts atop solid lithium support 93. The latter is molded with casing 81 into the surface 92 of casing 81 to be coaxial with the axis of the assembly of capsule 15. As will be understood by one skilled in the art, support 93 also advantageously locates co-axially with the axis of surface 92 and beam 13 when the beam 13 is directed against target 67. The support 93 has the advantage that it holds the target pellet 67 at the focus of the reflector formed by the surface 92 of casing 81, and can be vaporized.

The laser beam 13 and reflecting surface 92 interact to provide the desired flux distribution at the surface 95 of pellet shaped target 67. To this end, a portion of the flux of laser light beam 13, illustrated in FIG. 4, as ray "d", impinges directly on the surface 95 of target 67, whereby the combination of this ray "d" and the above described rays "a", and "b", interact with substantially the entire surface 95 of target pellet 67. Advantageously, the light rays in beam 13 interact with surface 95 of target pellet 67 in the described manner, directly from beam 13 and indirectly by axial reflection from surface 92 of casing 81. This has the result that the pellet-shaped target 67 is relatively uniformly heated over a large fraction of its surface 95, as is understood in the art. In this regard, in all cases the plasma 21 becomes so hot that it destroys the target 67, the target support 93 and the reflector itself by vaporization, and because of the energy input from the rapidly expanding pellet-shaped target 67. Thus, the light rays need not always strike the target exactly radially, and near radial is also acceptable. Moreover, the reflecting surface 92 may be shaped to "burn off" the target support at the time of the irradiation by beam 13. This is accomplished by shaping a small bottom portion 92′ of surface 92 in the form of a dish to divert part of the laser light in beam 13, e.g. rays "c" directly to interact with the top of the support 93 for target 67.

The lithium material of support 93 and casing 81 do not become radioactive, other than to produce tritium, which is a desirable reaction product, and does not introduce foreign material. The system of this invention, therefore, is compatable with the so-called "Blacson" concept of the above-mentioned co-pending Fraas application where the use of a vortex of liquid lithium absorbs both blast energy and associated neutrons from a laser-pellet microexplosion. This concept works best with "Blascon," as the casing 81 becomes vaporized by the microexplosion and thereby mixes easily with the lithium of the vortex.

In an example of the reflecting surface 92 of the invention, the above casing 81 has a thin, reflecting, metal coating 97 thereon that like the casing 81 has a high reflectivity to laser light beam 13. Advantageously, the material of this light reflecting coating 97 of this casing 81 has a high reflectivity (near 100%) and remains attached to the lithium of casing 81 during the irradiation thereof by laser beam 13. However, coating 97 can become separated from the lithium of casing 81 after irradiation of the casing 81 by beam 13, and is separated from lithium outside the chamber 19 by conventional chemical or other recovery processes. One suitable material for coating 97 comprises a thin gold mirror coating that is applied by conventional evaporation methods, although a copper coating can likewise be employed. After assembly, it will immediately assume the temperature of the casing 81 which is near liquid or solid hydrogen temperatures so as not to melt the pellet-shaped target 67. This provides low energy losses from beam 13, other than in heating target pellet 67.

The reflecting surface 92 that surrounds the pellet 67 operates as an efficient reflector for only one pulse of laser light beam 13, the duration of this single shot being of the order of picoseconds ($10^{-12}$ second) to nanoseconds ($10^{-9}$ second). In this regard, it is known from materials studies that a damage threshold exists for this reflecting surface 92. Below this threshold the reflecting surface functions as intended, but above this threshold the performance thereof degrades during the laser pulse, which comprises an unacceptable condition. The area of reflecting surface 92 has a size, therefore, so that nowhere will the laser intensity exceed the damage threshold, i.e. this restriction sets a lower limit on the area of the reflecting surface 92.

Damage thresholds for material for use in laser applications are usually expressed in terms of specific energy, i.e. joules per square centimeter, and this threshold varies as a function of laser pulse length. Today, the state-of-the-art for lenses and mirrors for laser pulses in the picosecond to nanosecond range is near 10 joules/cm$^2$ for long operating lifetime applications.

For the single shot application of this invention, estimates suggest that power levels may range between 100–1000 joules/cm$^2$. This being the case, the minimum area for reflecting surface 92 for this particular application will be determined roughly from the following relation, $$A_m = P_e/\eta(T)$$

where $A_m$ = the mirror area of reflecting surface 92; $P_e$ = the laser light output of beam 13 in joules; and $\eta(T)$ = the damage threshold, which is a function of the laser pulse width, in joules/cm$^2$.

Laser pulse powers of $10^5$ joules are thought necessary for the laser-pellet fusion application of this invention. Accordingly, at a damage threshold of 1000 joules/cm$^2$, the mirror reflecting surface 92 has a required area of 100 cm$^2$.

In the operation of the embodiment of FIG. 3 of the system of this invention for producing laser-pellet micro-explosions, the distance $D_{LP}$ separating the laser 11 from the target 67 is minimized for ease of the aiming of beam 13. On the other hand, the aperture 38 formed by rotating shutter wheel 49 in shield 51, moves slowly compared to the neutrons and/or other reaction products having high charged particle velocities that are produced in plasma 21, which is formed by irradiating the target 67 with the laser light beam 13. Therefore, the distance $D_{SP}$ separating the aperture 38 from the target 67 is advantageously maximized as a practical matter within the skill of the art based upon a reading of the specification of this application to permit the aperture 38 to close before the fusion or other particles in the expanding plasma 21 reach the aperture 38. In this regard the speed of the light in beam 13 is about 30 cm/nanosecond, and compares to the several nanoseconds it takes to produce the plasma 21, and for the particles therein, such as the neutrons therefrom, to reach the aperture 38.

The rotational speed of the opening 59 in the described aperture means 17, which is limited in speed (here denoted $V_s$) by material strength to a maximum of about $10^5$ cm-sec$^{-1}$, employs the strength of a conventional high strength material for shutter wheel 49 in the embodiment described herein. The velocity $V_n$ of 14 MeV neutrons from the target 67 is about $5 \times 10^8$ cm-sec$^{-1}$. Now considering an aperture means 17, comprising a high speed, high strength steel, disk-shaped shutter wheel 49, forming an opening 59 having a diameter=d moving past the fixed plate shaped shield 51, whose aperture 38 corresponds in diameter to opening 59, the aperture means 17 of FIG. 3 opens when aperture 38 in shield 51 and opening 59 in shutter wheel 49 align, and closes when their axes separate in parallel a distance = d. Let $T_s$ = the aperture shutter closing time and $T_n$ = the time required for fusion neutrons to move from the pellet-shaped target 67 to the aperture 38, a distance $D_{SP}$, so that $$\tau_s = d/V_s \text{ and} \tag{1}$$

$$\tau_n = D_{SP}/V_n \quad (2)$$

Effective shuttering occurs when $\tau_s = \tau_n$ or $$d = D_{SP}\frac{V_s}{V_n} \sim D_{SP}\frac{10^5}{5 \times 10^8} = 2 \times 10^{-4} D_{SP} \quad (3)$$

To minimize neutron streaming toward laser 11, i.e. up laser light channel 98 and through blast confinement chamber 99 formed by aperture means 17 in vacuum chamber 19, as well as to minimize the force of the blast that strikes the aperture means 17, $D_{SP}$ in advantageously 1–2 meters. At 1 meter, $$d \sim 2 \times 10^{-2} \text{ cm} = 0.2 \text{ mm} \quad (4)$$

If $D_{SP}$ were larger, d would be proportionally larger. But if $D_{LP}$ is to be minimized, then $D_{SP}$ must also be minimized. The significance of a preferred diameter d = 0.2 mm is simply that it is small (of the order of less than one millimeter) rather than large (of the order of the laser diameter, i.e. about tens of centimeters or more).

Advantageously, the laser beam 13 focuses to a tiny diameter in aperture means 17, as illustrated schematically in FIG. 3. Moreover, the laser beam 13 advantageously focuses to a tiny diameter at the target 67. To this end, the additional focusing element required between the aperture means 17 and the target 67 is provided by the assembly capsule 15 of this invention, which as described above has an elliptic shaped reflecting surface 92 on the inside of casing 81 in the preferred embodiment of this invention. This has the advantage of providing a relatively inexpensive arrangement that provides ease of aiming. In regard to the latter, an initially relatively broad laser beam 13 from laser 11 may be used, whereby a relatively wide tolerance for the assembly of target 67 above reflecting surface 92 is provided. This contrasts to the problems connected with hitting a tiny pellet, such as required by the above-mentioned patents, where accurate finely focused beams are also required. Additionally, the casing 81 has the advantage of providing a heat shield that protects the target 67, which is initially advantageously at cryogenic temperatures, from the high temperature environment in the vacuum chamber 19.

While the above has generally described examples of this invention, it will be understood that this invention is particularly adapted for use in connection with the subject-matter of the above-mentioned co-pending Fraas application, which may be used alone or in combination with other conventional lasers, as is understood by one skilled in the art from a reading of the invention described herein. For example, these lasers may comprise rod-shaped ruby or glass lasers with conventional helically wound, or straight, excitation flash tubes surrounding and illuminating or otherwise energizing the cores thereof. Also, suitable housing, amplifier and trigger electrode elements may be used, together with electrical connections to the end of the flash lamps, which, being conventional in lasers, are not otherwise disclosed herein in more detail. As is conventional, the laser 11 has suitable reflectors at the ends threof. Moreover, as understood from the above, the confinement system of the above-mentioned Fraas application is ideally suited for use in connection with this invention. Thus, in one example that will be understood from the above and the above-mentioned co-pending Fraas application, which has been allowed and is incorporated by reference herein, the assembly capsule 15 may be rotated and dropped by free fall into a "blascon" blast chamber 19 having a swirling vortex of liquid lithium therein that absorbs the blast energy and associated neutrons from the described laser-pellet micro-explosion. In this regard, the laser beam 13 advantageously passes through an aperture 38 formed by the described aperture means 17, which is above a swirling lithium vortex to protect the laser 11 from the micro-explosion, and the laser 11 is timed to hit the target 67 in casing 81 as the assembly capsule 15 falls in the vortex. In this regard, the rotation of the assembly capsule 15 stabilizes it, as will be understood by one skilled in the art. To this end, the axis of capsule 15 and reflecting surface 92 line up, or nearly line-up with an off-set laser beam 13 also coming through aperture 38 so that the target 67 and beam 13 interact as described above in accordance with this invention.

This invention has the advantage of providing a laser-target irradiation system utilizing a single laser beam source. Also, this invention provides protection for the laser source. Additionally, this invention provides a support for the target and a reflector for focusing laser light from a single source to interact the same over a large fraction of the surface of the target. Thus, an aperture is provided far enough away from the target for protecting the laser light source from the reaction products from the laser target interaction or micro-explosions. In this regard, the apparatus of this invention provides for the destruction of the target and holder therefor. Also, this invention provides for a stable target for use in a "blascon" such as described in the above-mentioned co-pending Fraas application.

What is claimed is:

1. In an optical system of transporting laser light from a laser of the class wherein a laser interacts a laser light beam in a vacuum along an axis from the laser against a target in the vacuum on said axis, the combination with the laser and the target of a shutter means for receiving and transporting the laser light beam from the laser against the target, comprising:
   a. laser means for producing a laser light beam in a vacuum along an axis;
   b. target means in the vacuum along the axis for producing products from the interaction of the laser light beam and the target;
   c. shield means defining an aperture along the axis; and
   d. rapidly rotating wheel means defining an opening that rotates in said shield means to provide a continuously unbroken path along the axis when the opening and aperture are in alignment along the axis, said wheel means being rotatable in said shield means selectively to block the path when the aperture and opening are out of alignment for selectively sequentially transmitting the laser light beam along the axis to the target and then blocking the products of the interaction of the laser light beam and the target from being transported to the laser through the shield after the interaction.

2. The optical system of claim 1 having solid means for focussing the laser light beam to a tiny diameter having a high energy density without space charge effects in the opening in the rapidly rotating wheel means.

3. The optical system of claim 1 having a target means that has a shaped mirror that holds the target means close to the mirror for receiving and focussing laser light passing through the opening and the aperture on to the target means.

4. The optical system of claim 1 having a target means that is located by free-fall from about 1-2 meters from the shield means.

5. The optical system of claim 1 in which the shield means and the wheel means are radiation flux inhibitors for blocking the return of radiation along the axis of the laser light beam from the interaction of the target means and the laser light when the aperture and opening are out of alignment.

6. The optical system of claim 1 in which the target means, shield means and wheel means are absorbers of blast energy and associated radiation from the laser target interaction.

7. The optical system of claim 1 having a single laser light source, and means for focussing the light passing through the shield means and wheel means to provide a high laser light flux at substantially the entire surface of the target means.

8. The optical system of claim 1 having means for focussing the laser light passing through the shield means and the wheel means to completely destroy the target means.

9. In an optical system for transporting a laser light from a laser wherein a laser light beam interacts along an axis of the laser with a target on said axis, the combination of a laser, a target and a shutter means for receiving and transporting the laser light beam from the laser against the target, comprising:
  a. a laser for producing a laser light beam along an axis;
  b. a target along the axis for producing products from the interaction of the laser light beam and the target;
  c. a shield defining an aperture along the axis, and
  d. a rapidly rotating wheel defining an opening that rotates in said shield to provide a continuously unbroken path along the axis when the opening and aperture are in alignment along the axis, said wheel being rotatable in said shield selectively to block the path when the aperture and opening are out of alignment for selectively sequentially transmitting the laser light beam along the axis to the target and then blocking the products of the interaction of the laser light beam and the target from being transported to the laser through the shield after the interaction.

* * * * *